United States Patent [19]

Fabian et al.

[11] Patent Number: 4,566,886
[45] Date of Patent: Jan. 28, 1986

[54] PROCESS AND APPARATUS FOR OBTAINING PURE CO

[75] Inventors: Rainer Fabian, Geretsried; Freimut Marold, Neubiberg; Dieter Latzin, Munich, all of Fed. Rep. of Germany

[73] Assignee: Linde Aktiengesellschaft, Wiesbaden, Fed. Rep. of Germany

[21] Appl. No.: 600,059

[22] Filed: Apr. 12, 1984

[30] Foreign Application Priority Data

Apr. 12, 1983 [DE] Fed. Rep. of Germany ....... 3313171

[51] Int. Cl.⁴ ................................................ F25J 3/06
[52] U.S. Cl. ............................................ 62/11; 62/17;
62/23; 62/29; 62/39; 55/32; 55/68
[58] Field of Search ................ 62/11, 17, 18, 23, 24, 62/27, 29, 32, 38, 39; 55/23, 32, 36, 40, 42, 43, 44, 46, 49, 51, 68

[56] References Cited

U.S. PATENT DOCUMENTS 4,217,759 8/1980 Shenoy .................................. 62/23

FOREIGN PATENT DOCUMENTS 84031 8/1971 German Democratic Rep. .... 62/23

*Primary Examiner*—S. Leon Bashore
*Assistant Examiner*—Andrew J. Anderson
*Attorney, Agent, or Firm*—Millen & White

[57] ABSTRACT

For obtaining pure CO from a gaseous mixture, consisting predominantly of hydrogen and carbon monoxide, e.g., that produced by the endothermic catalytic oxidation of hydrocarbons in the presence of $CO_2$ as the oxygen-yielding agent the gaseous mixture is compressed; residual $CO_2$ and water are removed by adsorption; the resultant purified gaseous mixture is cooled to condense a predominant portion of CO; the condensed CO is pressure-reduced to remove dissolved $H_2$ in the gaseous phase, the latter being recycled in gaseous form to the gaseous mixture; a fraction of the remaining liquid CO is partially vaporized and engine expanded to produce refrigeration for the system, and after engine expansion, is recycled to the gaseous mixture upstream of the compressor.

19 Claims, 4 Drawing Figures

PROCESS AND APPARATUS FOR OBTAINING PURE CO

BACKGROUND OF THE INVENTION

This invention relates to a low temperature process and apparatus for obtaining pure CO from a gaseous mixture consisting essentially of hydrogen and carbon monoxide. Such mixtures are produced for example by the endothermic catalytic oxidation of hydrocarbons in the presence of $CO_2$ as the source of oxygen.

DAS No. 2,711,991 discloses a process wherein a gaseous mixture having a proportion of CO of about 70 vol-% and a proportion of $H_2$ of about 30 vol-%, as well as a negligible amount of $CO_2$ and $CH_4$ is obtained by the endothermic catalytic oxidation of hydrocarbons in the presence of $CO_2$ as the oxygen source at approximately atmospheric pressure.

SUMMARY

An object of the present invention is to provide a process for separating CO in a simple and economical manner from the $H_2$-CO mixtures, especially from the 30–70 mixture mentioned above.

Another object is to provide associated apparatus for conducting the process of this invention.

Upon further study of the specification and appended claims, further objects and advantages of this invention will become apparent to those skilled in the art.

According to this invention, these objects are attained by providing that the $H_2$-CO gaseous mixture is compressed, preferably freed adsorptively of $CO_2$ and water still contained therein, and is cooled until the predominant portion of CO has been condensed; that the residual gaseous fraction is preferably heated and discharged; that the condensed CO is separated and expanded to remove dissolved $H_2$ in the gaseous phase; that the $H_2$ thus removed in gaseous form is recycled into the $H_2$-CO gaseous mixture; and that the remaining CO is, in part, preferably vaporized and withdrawn as the product and, in part, vaporized engine expanded, and recycled to said gaseous mixture.

Advantageously, the gaseous fraction remaining after condensation of the predominant portion of CO is heated in heat exchange with $H_2$-CO mixture to be cooled. The $H_2$ removed in gaseous form is preferably further expanded before being returned to the gaseous mixture, mixed with a partial stream of liquid CO, and vaporized in heat exchange with $H_2$-CO mixture to be cooled. The CO to be discharged as the product is preferably first vaporized in heat exchange with $H_2$-CO mixture to be cooled. The $H_2$ removed in gaseous form is also preferably engine expanded prior to being returned into the gaseous mixture.

In this process, the $H_2$-CO gaseous mixture is advantageously compressed to a pressure of between 6 and 20 bar, preferably 9 and 15 bar; the condensed CO is expanded to a pressure of between 4 and 10 bar; and the $H_2$ removed in gaseous form is expanded to a pressure of between 1.3 and 2.5 bar.

It is possible by means of the process of this invention to obtain a CO product having a purity of 98 vol-%, with a CO yield of about 95% and a discharge pressure of up to 10 bar, preferably in the range of 1 to 7 bar. A higher discharge pressure, though physically possible, is generally uneconomical. At the same time, low initial investment costs can be achieved by the process of this invention, since an apparatus for conducting the process is structurally very simple. Such an apparatus generally comprises or consists essentially of a compressor, a heat exchanger, and an expansion turbine. An adsorber unit is also useful.

This invention is especially advantageous with plant sizes of about 200–1000 $Nm^3$ CO/h, but larger or smaller plants can also be used.

In a further development of the idea of this invention, the CO product stream to be conducted to the engine-expanding turbine is expanded, prior to vaporization, to a pressure of between 4 and 7 bar whereby the refrigeration capacity in the heat exchanger is increased. In the heat exchanger, the $H_2$-CO mixture is cooled to temperatures of between 70 and 80 K. Moreover, according to a further embodiment, the remaining gaseous fraction can be used, prior to discharge, as regenerating gas in the adsorber unit.

The CO product obtained with the process of this invention still has, depending on the discharge pressure, an $H_2$ content of 0.5–1.5 vol-%. This relatively high proportion of $H_2$ may interfere with some cases of application. Therefore, according to another aspect of this invention, the produced gaseous mixture is compressed to a pressure of between 6 and 20 bar, preferably between 7 and 15 bar; the compressed $H_2$-CO mixture is cooled to a temperature of 85–95 K to obtain the predominant portion of CO and a remaining gas; the remaining gaseous fraction is further cooled to 70–75 K to obtain additional condensed CO and a residual gas; the residual gas is heat exchanged with said remaining gaseous fraction to be cooled, and then discharged; and the thus-condensed additional CO is vaporized in heat exchange with said remaining gaseous fraction to be cooled and this vaporized CO is admixed to the $H_2$-CO gaseous mixture upstream of the compression step. The predominant portion of CO condensed out during the first cooling step is divided into three partial streams: subjecting a first partial stream being a primary stream to a carbon monoxide stripping step to remove $H_2$; vaporizing a second partial stream, the latter being utilized as the stripping gas; expanding a third partial stream to a pressure of between 4 and 7 bar, and vaporizing resultant expanded stream in heat exchange with the compressed gaseous $H_2$-CO mixture to be cooled; engine expanding resultant heated third partial stream; utilizing the refrigerant value of the resultant cooled third partial stream and then recycling said stream to the gaseous mixture upstream of the compression step.

By using this preferred aspect of the invention when higher CO purities are desired, the fraction of the $H_2$ that remains dissolved in the pure CO is instead of 0.5–1.5 vol-%, less by a factor of above 10, i.e. less than 0.05–0.15 vol-%, especially less than 0.2 vol-%.

According to a still further preferred modification, it proved to be advantageous to provide that the CO product purified by stripping is vaporized in heat exchange with the $H_2$-CO mixture to be cooled. The vaporized CO product is then heated and discharged. The $H_2$-loaded stripping gas is expanded, heated in heat exchange with $H_2$-CO mixture to be cooled, and admixed to the gaseous mixture. In this way, the refrigerating capacity can be improved.

An apparatus for performing the last-mentioned version is characterized by an additional heat exchanger and a stripping column.

The present invention is applicable to any type of gas consisting essentially of hydrogen and carbon monoxide, preferably wherein the volumetric content of $H_2$ is 10 to 50 and the volumetric content of $CO_2$ is 50 to 90.

The invention can be practiced, though not as with as much facility, by omitting certain features, as follows: Recycling resultant evolved $H_2$ into the gaseous mixture, recycling resultant engine expanded fraction to the gas mixture.

BRIEF DESCRIPTION OF DRAWINGS

The attached drawings are schematic figures of preferred embodiments of the invention.

DETAILED DESCRIPTION

Figure 1:
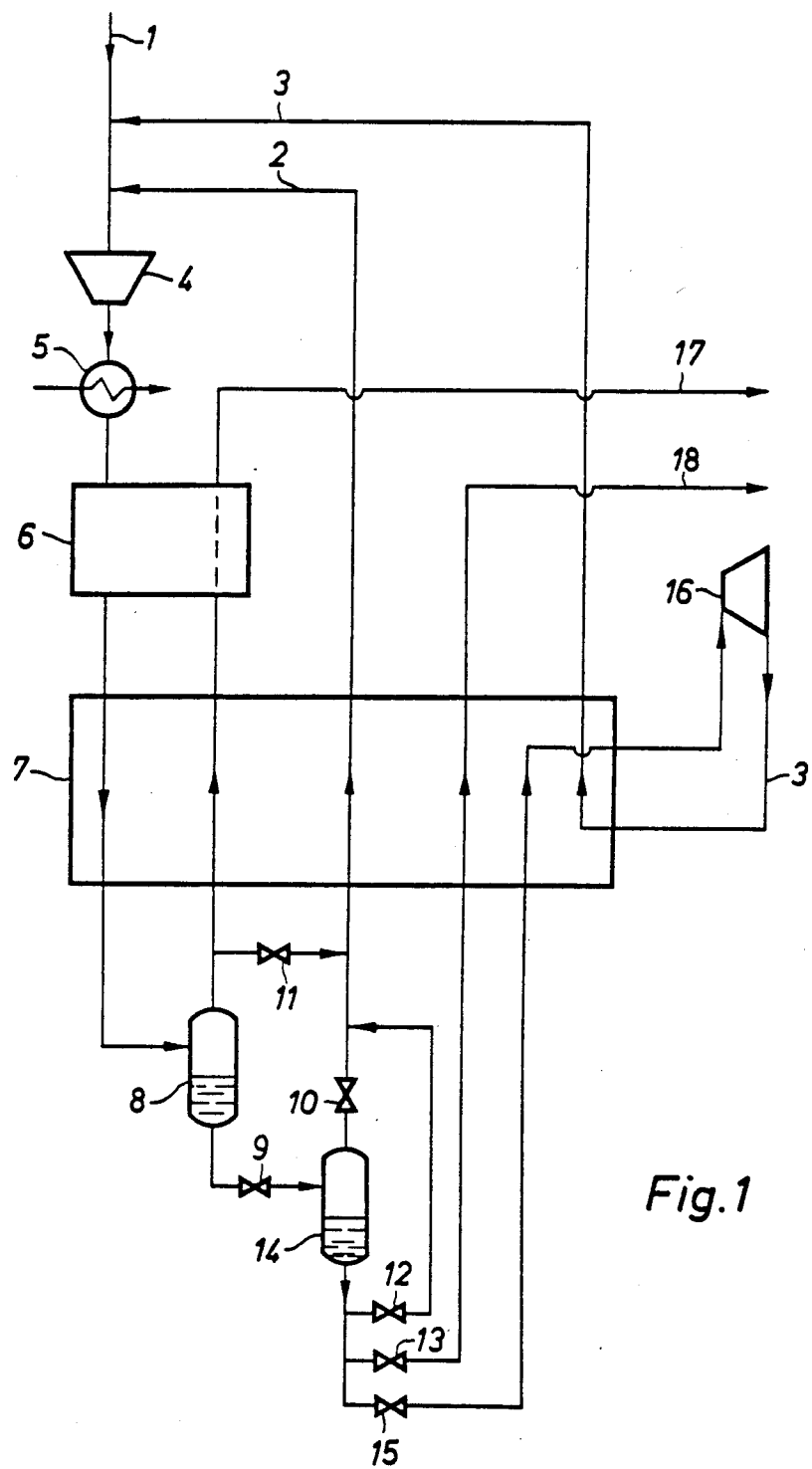
FIG. 1 illustrates a simple flowsheet for conducting the process.

According to FIG. 1, a gaseous mixture produced during a preceding endothermic catalytic oxidation of hydrocarbons, not shown, and comprised primarily of $H_2$ and CO and with minor amounts of $CO_2$ and $H_2O$ is supplied by way of conduit 1 and mixed with a gas from conduits 2 and 3 resulting from a low-temperature fractionation step (to be explained in greater detail below), and compressed in a compressor 4 to a pressure of 6–20 bar, preferably 9–15 bar. The gaseous mixture is cooled in a cooler 5 against cooling water and freed of water and $CO_2$ in an adsorber unit 6. In a heat exchanger 7, the $H_2$-CO mixture is deeply cooled to about 70–80 K, thus condensing the predominant portion of CO, e.g., at least 90–98, preferably at least 95% of the CO, and separating this portion in a phase separator 8. The remaining gaseous fraction, $H_2$ with about 7 volume % of CO, is heated in heat exchanger 7, utilized in adsorber unit 6 as the regenerating gas, and discharged under pressure via conduit 17.

The liquid from separator 8 is expanded (by "expanded" in connection with liquids is generally intended to mean pressure-reduced) in a valve 9 to a pressure lying somewhat higher than the CO discharge pressure (4–10 bar), the pressure drop across the valve 9 being about 5 to 13 bar. During this step, $H_2$ dissolved in separator 14 is released in the gaseous phase. This $H_2$ is expanded in a valve 10 to about 1.3–2.5 bar and mixed with a partial stream of the gaseous fraction remaining in separator 8 by way of pressure reducing valve 11 and with a partial stream by way of a pressure reducing valve 12. The source of liquid entering valve 12 is from either the liquid of separator 14 or separator 8, the conduit from the latter to valve 12 not being shown. Vaporization of the mixture in conduit 2 in heat exchanger 7 provides the low temperature for condensation in separator 8. After being completely vaporized and heated, the mixture in conduit 2 is introduced into the gaseous mixture upstream of compressor 4.

The quantity of product CO withdrawn from separator 14 is adjusted by a valve 13, and the product CO is then vaporized in heat exchanger 7 and discharged in the heated state (conduit 18).

To produce the required refrigeration, a sufficient portion of the liquid CO from separator 14 (generally about 10 to 30%) and optionally also from separator 8, is expanded via a valve 15 to a low pressure (4–7 bar), then vaporized in heat exchanger 7, and thus heated, and is then engine expanded in an expansion turbine 16. The pressure drop across valve 15 is generally about 3 to 11 bar and across turbine 16 about 4 to 7 bar. The resultant turbine expanded gaseous stream is further reheated via conduit 3 by heat exchanger 7 and admixed to the gaseous mixture in conduit 1 upstream of the compressor 4.

According to FIG. 2, the entering gaseous mixture is mixed, by way of conduit 101, with gas from conduits 102 and 103 from a subsequently arranged low-temperature fractionation, which will be described in greater detail below, and compressed in a compressor 104 to a pressure of 6–20 bar, preferably 7–15 bar. The gaseous mixture is cooled in a heat exchanger 105 against cooling water and liberated of $H_2O$ and $CO_2$ in an adsorber unit 106. In a heat exchanger 107, the $H_2$-CO mixture is cooled to about 90 K, thus condensing a major portion of the CO, the latter being separated in a phase separator 108. The remaining gaseous fraction 109 is further cooled in a heat exchanger 110 to about 70–75 K condensing out additional CO, the latter being separated in a phase separator 111. The thus-remaining gaseous fraction is heated in heat exchangers 110 and 107, used as the regenerating gas in the adsorber unit 106, and discharged via conduit 123 under pressure as impure $H_2$ with about 7 vol-% CO.

The liquid CO from phase separator 111 is expanded in a valve 112 and mixed with some $H_2$ (about 2 to 15% of the vapor withdrawn from phase separator 111) via valve 113. This mixed stream in conduit 114 is vaporized in heat exchanger 110, thus providing the low temperature required for the fluid entering phase separator 111. After further vaporization in heat exchanger 107, the mixed stream is fed via conduit 102 to the entering gaseous mixture.

The liquid from phase separator 108 is divided into three partial streams: The primary stream (generally about 50 to 80% of the total stream) is conducted via pressure reducing valve 115 into a stripping column 116 lying somewhat above the CO discharge pressure. A small stream (generally about 5 to 10% of the total stream) is expanded via valve 117, vaporized in heat exchanger 107, and introduced as the stripping gas at the bottom of the stripping column 116. The third stream is expanded in a valve 118 to about 4–7 bar, vaporized and heated in heat exchanger 107, and engine expanded in an expansion turbine 119. This steam is admixed via conduit 103, after being heated in heat exchanger 107, to the gaseous mixture in conduit 101.

In stripping column 116, liquid from valve 115 is heated to the boiling point by the stripping gas (the vaporized stream from 117), thereby removing all but a small fraction of the $H_2$ from the CO liquid. The thus-purified CO leaves the column 116 by way of a valve 120. It is then vaporized and heated in heat exchanger 107, and discharged as the product via conduit 124, the product purity being generally about at least 99, preferably 99.8% CO.

The overhead product from stripping column 116, namely an $H_2$-CO mixture, is expanded in a valve 121, admixed with stream 114, heated in heat exchanger 107, and combined as stream 102 with the gaseous mixture in conduit 101.

In order to stabilize the temperature in separator 108, it is practical to expand liquid CO therefrom via a valve 122, vaporize same in heat exchanger 107, and admix same with the turbine exhaust which is recycled to entering gas.

Figure 3:
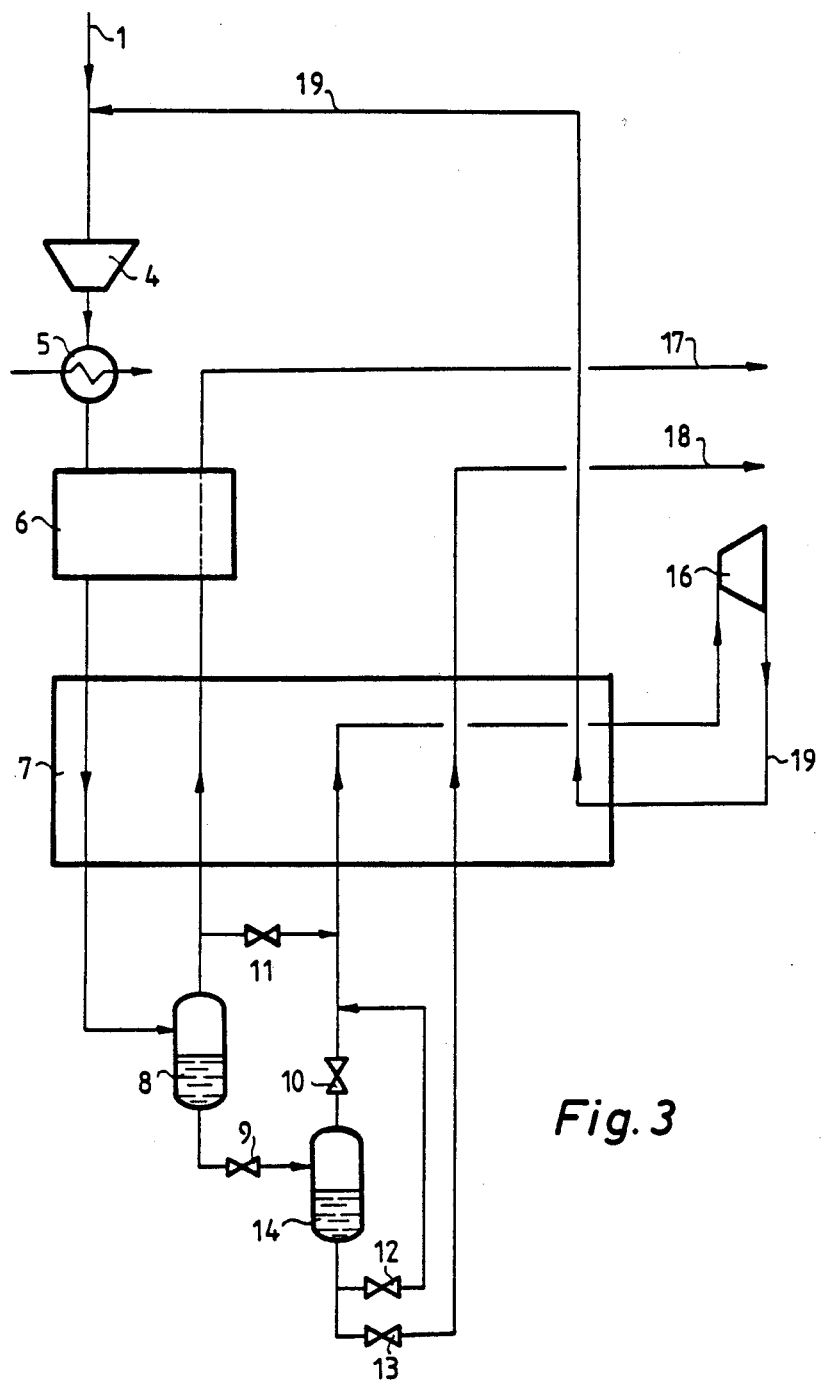
FIG. 3 is a modification of the process as performed according to FIG. 1.

The embodiment according to FIG. 3 differs from that in FIG. 1 primarily with respect to the combining of the recycle stream and the turbine stream. The recycle stream produced in valves 10, 11 and 12 is vaporized at a higher pressure (3–8 bar instead of 1.3–2.5 bar). In order to obtain an equally low temperature profile as under low pressure, it is necessary to add more $H_2$-rich gas via valve 11. This stream, after its total vaporization and optionally superheating, is expanded in turbine 16. The stream in conduit 19 is in any case smaller than the total of the streams in conduits 2 and 3 according to FIG. 1, whereby recompression requires correspondingly less energy.

Figure 2:
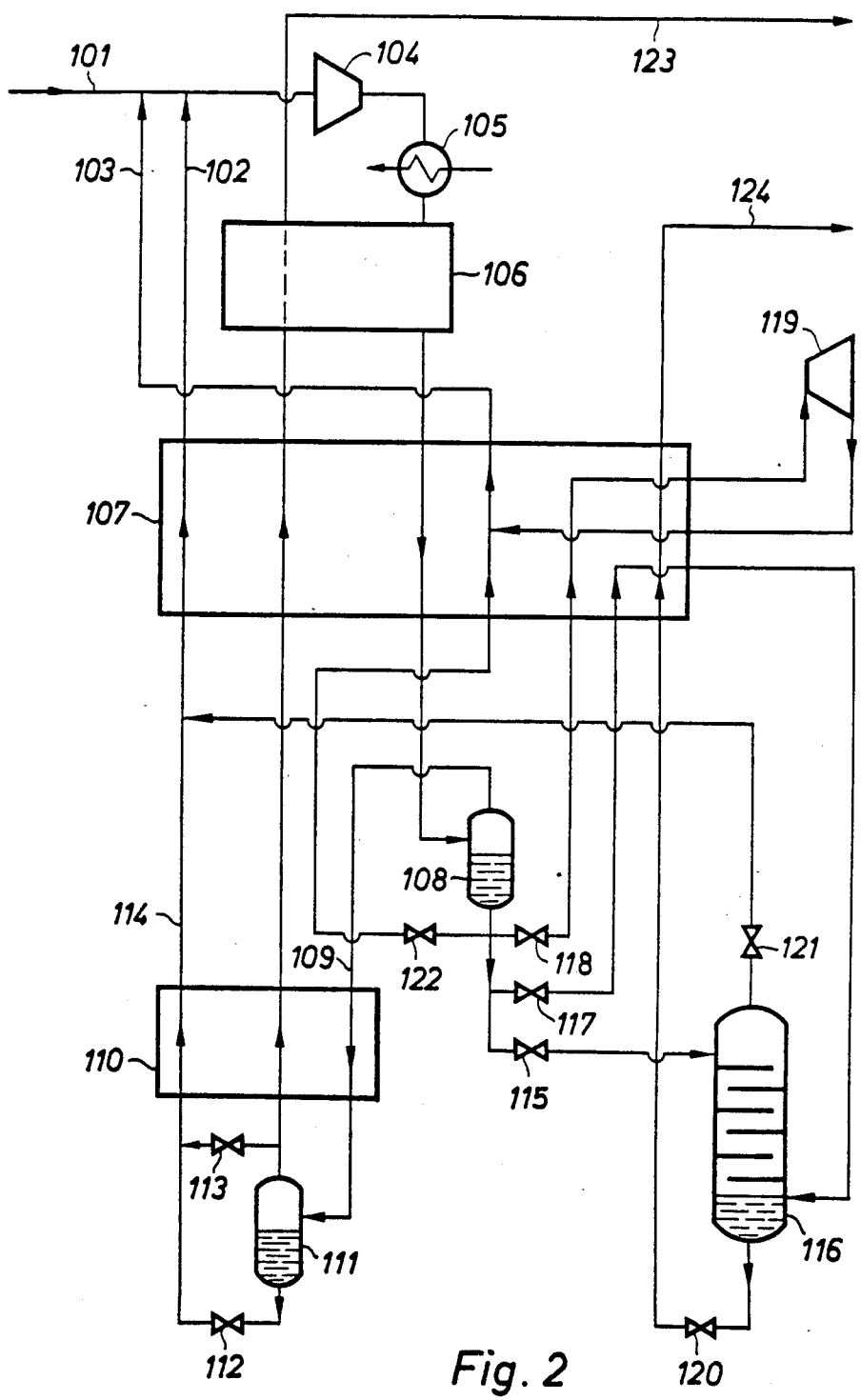
FIG. 2 illustrates a flowsheet yielding an increased separation of $H_2$.
Figure 4:
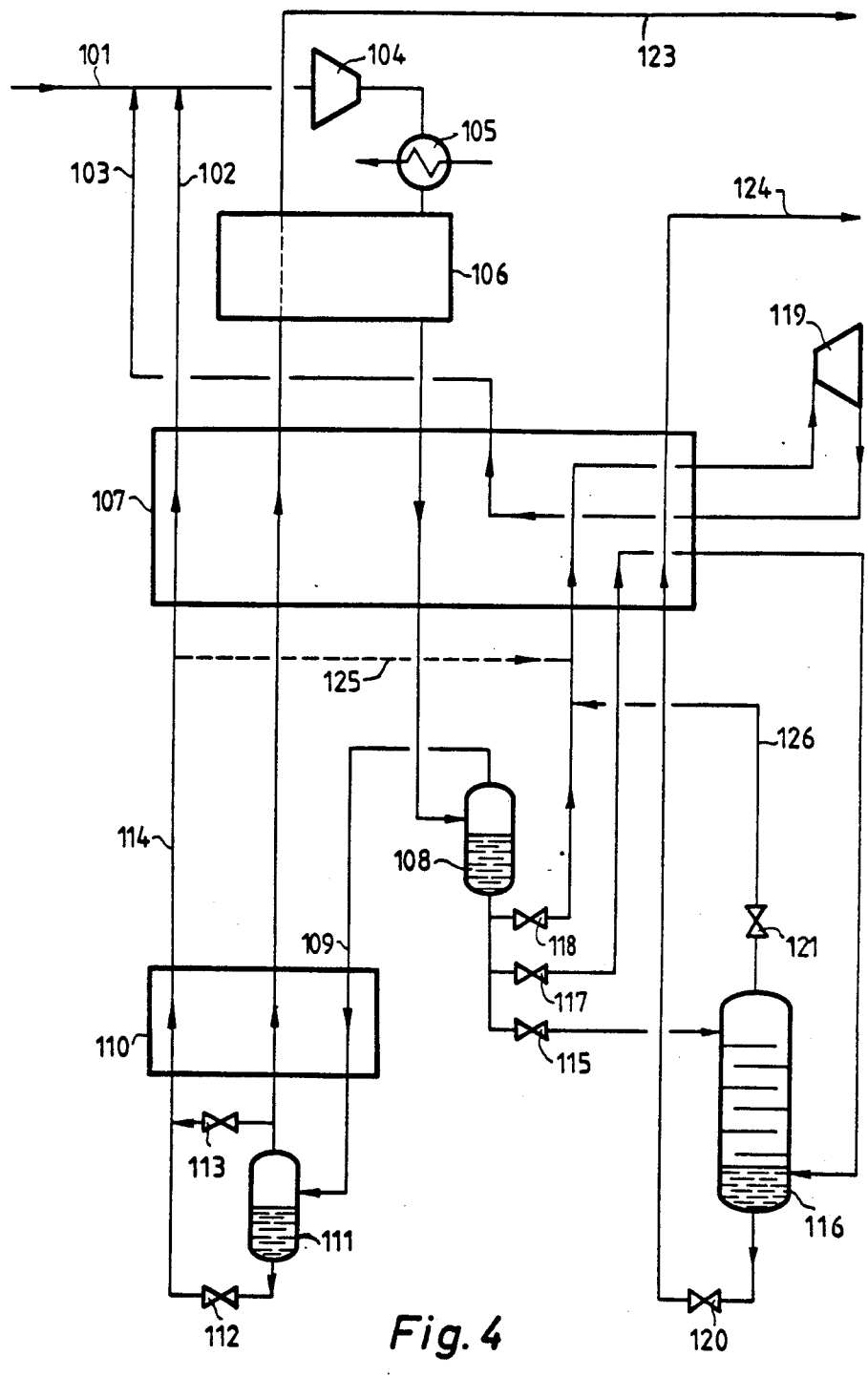
FIG. 4 is a modification of the process as performed according to FIG. 2.

The embodiment illustrated in FIG. 4 corresponds essentially to that of FIG. 2. The $H_2$-rich overhead product from column 116 is, however, in this case admixed via valve 121 and conduit 126 to the turbine stream from valve 118. Accordingly, here, too, the vaporization pressure can be raised and with it the pressure gradient at turbine 119. With the same refrigeration requirements, the amount of the stream from valve 118 can be reduced whereby here again compression energy is saved in connection with the stream in conduit 103.

The streams in conduit 114 or 102, respectively, may be left as is in those cases where combining of the streams in conduits 102 and 103 is not beneficial. Conversely, where beneficial, combining is indicated by the conduit 125 shown in dashed lines. By means of this conduit, still additional recompression energy can be saved. The use of conduit 125 is beneficial in the case that the pressure of the stream in conduit 114 is high enough to lead this stream directly to the turbine 119.

The preceding embodiments can be modified with similar success by substituting the generically or specifically described starting mixture and/or operating conditions of this invention for those used in the preceding embodiments.

From the foregoing description, one skilled in the art can easily ascertain the essential characteristics of this invention, and without departing from the spirit and scope thereof, can make various changes and modifications of the invention to adapt it to various usages and conditions.

We claim:

1. A process for obtaining purified carbon monoxide from a gaseous mixture consisting essentially of hydrogen and carbon monoxide ($H_2$-CO), comprising compressing the $H_2$-CO gaseous mixture; cooling the compressed gaseous mixture to condense a predominant portion of the carbon monoxide containing dissolved hydrogen; pressure reducing resultant condensed carbon monoxide to evolve dissolved $H_2$ in the gaseous phase thereby obtaining purified liquid carbon monoxide; recycling resultant evolved $H_2$ into said gaseous mixture; vaporizing a fraction of resultant purified carbon monoxide, engine expanding resultant vaporized fraction, and recycling resultant engine expanded fraction to said gaseous mixture, and withdrawing another fraction of said purified carbon monoxide as product.

2. A process according to claim 1, wherein simultaneous with the condensation of the predominant portion of the carbon monoxide, a residual gaseous fraction is obtained, and further comprising heating said residual gaseous fraction in indirect heat exchange relationship with the compressed gaseous mixture to be cooled.

3. A process according to claim 1, further comprising prior to recycling said resultant evolved $H_2$ to the gaseous mixture, expanding said resultant evolved $H_2$, mixing the resultant expanded $H_2$ with a partial stream of condensed liquid CO, and vaporizing the resultant fluid in indirect heat exchange relationship with said gaseous mixture to be cooled.

4. A process according to claim 1, further comprising an intermediate step of vaporizing said another fraction of carbon monoxide to be discharged as the product in indirect heat exchange relationship with the gaseous mixture to be cooled.

5. A process according to claim 1, further comprising an intermediate step of engine expanding the resultant evolved $H_2$ prior to the recycling of the latter to the gaseous mixture.

6. A process according to claim 1, wherein said gaseous mixture is compressed to a pressure of between 6 and 20 bar, the condensed carbon monoxide is pressure-reduced to a pressure of between 4 and 10 bar, and the resultant evolved $H_2$ is expanded to a pressure of between 1.3 and 2.5 bar prior to being recycled to the gaseous mixture.

7. A process according to claim 6, wherein the gaseous mixture is compressed to a pressure between 9 and 15 bar.

8. A process according to claim 1, wherein the carbon monoxide stream to be conducted to engine expansion is expanded, prior to vaporization, to a pressure of between 4 and 7 bar.

9. A process according to claim 1, wherein the compressed gaseous $H_2$-CO mixture is cooled to 70–80 K.

10. A process according to claim 2, further comprising removing $H_2O$ and $CO_2$ from the compressed gas prior to cooling, the $H_2O$ and $CO_2$ being removed by adsorption in an adsorber unit, and the residual gaseous fraction is further utilized as a regenerating gas for the adsorber unit.

11. A process according to claim 1, further comprising removing $H_2O$ and $CO_2$ from the compressed gas prior to cooling, the $H_2O$ and $CO_2$ being removed by adsorption in an adsorber unit.

12. A process according to claim 1, wherein the $H_2$-CO gaseous mixture to be treated is obtained from an endothermic catalytic oxidation of hydrocarbons with $CO_2$ as the oxygen source.

13. A process according to claim 1, wherein said $H_2$-CO gaseous mixture is compressed to a pressure of between 6 and 20 bar; the resultant compressed gaseous mixture is cooled to a temperature of 85–95 K to form the predominant portion of condensed carbon monoxide and a remaining gaseous fraction; further cooling the remaining gaseous fraction to 70–75 K to form additional condensed carbon monoxide and a residual gas; passing said residual gas prior to being discharged in indirect heat exchange relationship with the remaining gaseous fraction to be cooled; vaporizing the additional condensed carbon monoxide in indirect heat exchange relationship with the remaining gaseous fraction to be cooled and admixing resultant vaporized additional condensed carbon monoxide to the gaseous mixture upstream of the compression step; dividing the predominant portion of the condensed carbon monoxide into three partial streams: subjecting a first partial stream being a primary stream to a carbon monoxide stripping step to remove $H_2$; vaporizing a second partial stream, the latter being utilized as the stripping gas; expanding a third partial stream to a pressure of between 4 and 7 bar, and vaporizing resultant expanded stream in heat exchange with the compressed gaseous $H_2$-CO mixture to be cooled; engine expanding resultant heated third partial stream; utilizing the refrigerant value of the resultant cooled third partial stream and then recycling said stream to the gaseous mixture upstream of the compression step.

14. A process according to claim 13, wherein the carbon monoxide product, purified by stripping, is vaporized in heat exchange with the compressed gaseous $H_2$-CO mixture to be cooled, is heated, and is discharged; and that the $H_2$-loaded stripping gas is expanded, heated in heat exchange with the compressed gaseous $H_2$-CO mixture to be cooled, and admixed to the gaseous mixture upstream of the compressor step.

15. A process for obtaining purified carbon monoxide from a gaseous mixture consisting essentially of hydrogen and carbon monoxide ($H_2$-CO) comprising compressing the $H_2$-CO gaseous mixture; cooling the compressed gaseous mixture to condense a predominant portion of the carbon monoxide containing dissolved hydrogen; pressure reducing resultant condensed carbon monoxide to evolve dissolved $H_2$ in the gaseous phase thereby obtaining purified liquid carbon monoxide; vaporizing a fraction of resultant purified carbon monoxide, engine expanding resultant vaporized fraction, and withdrawing another fraction of said purified carbon monoxide as product.

16. A process according to claim 15, further comprising recycling resultant evolved $H_2$ into said gaseous mixture.

17. A process according to claim 15, further comprising recycling resultant engine expanded fraction to said gaseous mixture.

18. Apparatus suitable for obtaining purified carbon monoxide from a gaseous mixture consisting essentially of hydrogen, carbon monoxide, carbon dioxide and water, said apparatus comprising a compressor for compressing the gaseous mixture, conduit means for transporting the compressed gas; selective adsorption means having an inlet and outlet for selectively removing carbon dioxide and water from the compressed gaseous mixture, said adsorption means inlet being in communication with the latter conduit means; heat exchange means having an inlet and outlet for cooling resultant gaseous mixture depleted in carbon dioxide and water to condense a predominant portion of the carbon monoxide containing dissolved hydrogen, further conduit means for communicating to the outlet of the adsorber means to the inlet of the heat exchange means; pressure reducing means for lowering the pressure on the condensed CO-$H_2$ mixture so as to remove hydrogen and form a purified liquid CO, additional conduit means communicating the outlet of the heat exchange means with said pressure reducing means; vaporization means for vaporizing at least a fraction of said purified liquid CO, still additional conduit means for transporting said purified liquid CO to said vaporization means; expansion turbine means for lowering the pressure and cooling at least a fraction of said vaporized purified CO, and still additional conduit means for transporting said vaporized purified CO to said expansion turbine means.

19. Apparatus according to claim 18 further comprising stripping column means for further purifying a fraction of said purified liquid CO; conduit means for passing said purified liquid CO to the upper part of said stripping column and further conduit means for passing a fraction of said vaporized purified CO to the bottom part of said stripping column means.

* * * * *